United States Patent
Boogaard

(10) Patent No.: US 6,197,377 B1
(45) Date of Patent: Mar. 6, 2001

(54) PREPARATION AND METHOD FOR APPLYING AN ANTI-SLIP LAYER TO A SURFACE AND PRODUCT PROVIDED WITH AN ANTI-SLIP LAYER

(75) Inventor: Werner Walther Richard Boogaard, Bilthoven (NL)

(73) Assignee: Boogaard Beheer B.V., Utrecht (NL)

( * ) Notice: Subject to any disclaimer, the term of this patent is extended or adjusted under 35 U.S.C. 154(b) by 0 days.

(21) Appl. No.: 09/214,296

(22) PCT Filed: Jun. 27, 1997

(86) PCT No.: PCT/NL97/00367

§ 371 Date: Jan. 15, 1999

§ 102(e) Date: Jan. 15, 1999

(87) PCT Pub. No.: WO98/00241

PCT Pub. Date: Jan. 8, 1998

(30) Foreign Application Priority Data

Jul. 3, 1996 (NL) .................................................. 1003495

(51) Int. Cl.[7] ................................. B05D 5/02; B05D 5/08
(52) U.S. Cl. ....................... 427/299; 427/385.5; 427/386; 427/407.1; 428/407
(58) Field of Search ................................ 427/299, 407.1, 427/385.5, 386; 428/407

(56) References Cited

U.S. PATENT DOCUMENTS

| | | | |
|---|---|---|---|
| 2,793,136 | 5/1957 | Root | 117/33 |
| 4,501,783 | * 2/1985 | Hiragami et al. | 428/147 |
| 5,070,138 | * 12/1991 | Bulluck | 524/871 |
| 5,494,729 | * 2/1996 | Henry et al. | 427/202 |
| 5,578,095 | * 11/1996 | Bland et al. | 51/295 |

FOREIGN PATENT DOCUMENTS

| | | |
|---|---|---|
| 33 20 929 | 12/1984 | (DE) . |
| 93 00 665 | 11/1994 | (NL) . |
| WO 88/00018 | 1/1988 | (WO) . |

* cited by examiner

*Primary Examiner*—Shrive Beck
*Assistant Examiner*—Kirsten A. Crockford
(74) *Attorney, Agent, or Firm*—Young & Thompson

(57) ABSTRACT

A preparation for applying an anti-slip layer to a surface which includes a coating composition containing particulate material and a curing agent, wherein the particulate material consists of synthetic granules. The invention also relates to a method for preparing the preparation and to a method for applying an anti-slip layer using the preparation, a product which is provided with an anti-slip layer and the use of a preparation comprising synthetic granules for applying an anti-slip layer to a surface.

14 Claims, No Drawings

PREPARATION AND METHOD FOR APPLYING AN ANTI-SLIP LAYER TO A SURFACE AND PRODUCT PROVIDED WITH AN ANTI-SLIP LAYER

BACKGROUND OF THE INVENTION

The invention relates to a preparation for applying an anti-slip layer to a surface wherein the preparation comprises a coating composition, containing particulate material, and a curing agent.

Such a preparation is known from U.S. Pat. No. 2,793,136 which discloses a preparation for applying a slip-resistant layer to a surface, wherein a layer of a fluid dispersion of finely divided angular or rough resin particles in a liquid plasticiser is applied on a surface as well as articles comprising such a slip-resistant layer. The resin particles must be—partly—soluble or gellable in the plasticiser when the latter is heated. More in particular, after having applied said fluid dispersion on the surface, a layer of embedded hard resin granules is obtained. The size of the granules may vary but is preferably $\frac{1}{16}$ to $\frac{1}{2}$ inch and a part of the granules should extend above the upper surface of the layer of the cured fluid dispersion. Subsequently, the surface and the respective layer are heated, so that the resin particles partly dissolve into the plasticiser. After cooling, this results in the formation of a solid resilient layer in which the granules are embedded such that at least a part of the granules extend above the upper surface of said layer. The resin particles are preferably copolymers of vinyl chloride and vinyl acetate, polyvinyl chloride, polymethyl methacrylate and copolymers of vinyl chloride and vinylidene chloride, whereas the plasticiser is preferably an ester such as dioctyl phtalate. The coating composition according to U.S. Pat. No. 2,793,136, however, does not contain a curing agent for cross-linking the plasticiser which cross-linking would provide a more wear resistant anti-slip layer.

A preparation of this type is also disclosed in British Patent Application 2 156 672. Said patent application describes a coating composition for providing a rough coating on a sanitary product. The composition comprises a polymer, preferably a polymethyl methacrylate, a filler, a particulate material and a curing agent, preferably benzoyl peroxide. The particulate material preferably consists of glass beads having a size of about 200 to 800 $\mu$m. The coating composition is applied, for example by means of a brush, to the bottom of, for example, a bathtub or a shower tray, as a result of which the bathtub or shower tray is provided with an anti-slip coating.

A disadvantage of the coating according to British Patent Application 2 156 672 is that the surface thereof is relatively polar because the layer consists of an acrylate and glass beads. Water will therefore easily be able to remain between the coated glass beads, which is disadvantageous for the anti-slip properties of the coating. As a result of the presence of water, growth of bacteria and moulds will also easily be able to take place, which is not only hazardous to health but also has an adverse effect on the anti-slip properties of the coating.

Preparations and compositions for applying an anti-slip layer to one or more surfaces of sanitary products are also disclosed in WO 88/00018, DE-A 3 320 929 and U.S. Pat. No. 4,363,145. WO 88/00018 describes a coating composition which contains an elastomer. Said coating composition can be applied to the bottom of a sanitary product, as a result of which the bottom is coated with a coating which has improved friction characteristics.

DE-A 3 320 929 describes a method with which a coating is applied to a sanitary product by the use of a rubber-containing synthetic material, a coating being obtained which is not smooth. It has been found that the bottoms of bathtubs and shower trays which have been provided with coatings obtained using such coating compositions possess inadequate anti-slip properties because the coating compositions do not contain particulate materials, as a result of which the relief of the coating is inadequate.

U.S. Pat. No. 4,363,145 describes a method for applying a coating to an enamel surface, with which method a template provided with openings is placed on the surface after the latter has been cleaned. The finish is then removed from the surface at the locations of the openings by etching with acid and the etched locations are cleaned. A layer of a polyurethane-containing enamel, a layer of silicon dioxide containing sand and a further layer of a polyurethane containing enamel are then applied in succession. The final steps are the removal of the template and curing of the layer obtained. The disadvantage of this method is the laborious nature thereof. A further disadvantage of this method is the use of silicon dioxide containing sand, which usually has a small particle size. When, for example, a shower tray is coated in accordance with the method according to said U.S. patent, the locations which are provided with the sand will be sharp and therefore will feel unpleasant.

SUMMARY OF THE INVENTION

The aim of the invention is, therefore, to overcome the abovementioned disadvantages by providing a preparation for applying an anti-slip layer to a surface, wherein the preparation comprises a coating composition containing a resin and a particulate synthetic material, characterized in that the coating composition further contains a curing agent and that said particulate synthetic material is an apolar material and has a Shore D hardness of 50 to 85. An advantage of the use of synthetic granules is that these are softer than, for example, glass beads and silicon dioxide containing sand. Surfaces which have been provided with an anti-slip layer according to the invention will therefore be pleasant to the touch.

Other advantages of the preparation according to the invention are that an anti-slip layer can be obtained which does not discolour, which is hard and scratch- and wear-resistant and which has an outstanding durability on the outside and a high resistance to chemical substances.

DESCRIPTION OF THE PREFERRED EMBODIMENTS

The synthetic granules are produced from an apolar synthetic material. Examples of such apolar synthetic materials are polypropene, polyethene, polystyrene, copolymers of ethene and vinyl acetate, copolymers of ethene and unsaturated alkenes such as, for example, propene, 1-butene, 1-hexene and 1-octene and EPDM rubbers. By using synthetic granules of an apolar synthetic material, a relatively apolar coating is obtained when the preparation according to the invention is applied to a surface, so that no or only very little water remains standing between the coated granules. It is also important that the synthetic material can be combined with the coating composition. According to the invention, the synthetic used is preferably polypropene or EPDM rubber, in particular EPDM rubber granules. The polypropene which is preferably used has the following properties:

Melt flow index (in accordance with ASTM D 238; 5 kg/230° C.): 2 g/10 min to 200 g/10 min.

Density (in accordance with DIN 53479): 0.9–1.2 g/cm³
Melting point: 60–180° C.
Shore D hardness (ASTM D2240): 60–80

The selection of the suitable synthetic granules depends, inter alia, on the hardness of the synthetic material. If it is desired to use a softer synthetic material, it is possible, for example, to use HDPE (Shore D hardness according to ASTM D2240 is approximately 65–69), LDPE (Shore D hardness according to ASTM D2240 is approximately 60–65) or even poly(1-butene) (Shore D hardness according to ASTM D2240 is approximately 55). According to the invention, the synthetic granules therefore have a Shore D hardness (ASTM D2240) of at least 45 and preferably of at least 50.

The synthetic granules can be of various sizes, the choice of the size depending on the use of the preparation. If, for example, the preparation is used to apply a coating in a bathtub or a shower tray, synthetic granules of a size such that a coating is obtained which is pleasant to the touch will be chosen. According to the invention, the synthetic granules therefore have an average size of 20–400 μm and preferably of 30–300 μm. As described above, the size of the synthetic granules is matched to the desired use. The synthetic granules therefore also have, in particular, an average size of 30–100 μm or an average size of 100–300 μm. However, it has also proved possible to use granules having a size of approximately 4 mm.

In order to obtain good adhesion of the preparation to the surface it is preferable, according to the invention, that the preparation also contains a surface-active agent. The surface-active agent is preferably a polysiloxane, such as, for example, propyltriethoxysilane, hexadecyltrimethoxysilane, vinyltris(2-methoxyethoxy)silane, 3-azidopropyltriethoxysilane, 3-thiocyanatopropyltriethoxysilane, 3-aminopropyltriethoxysilane and bis(3-triethoxysilylpropyl)amine. The surface-active agent is, in particular, 3-aminopropyltriethoxysilane and/or bis(3-triethoxysilylpropyl)amine of technical grade. The preparation according to the invention preferably contains 0.01 to 5% by weight of the surface-active agent and in particular an amount of 0.1–2% by weight.

According to the invention the preparation can also contain one or more other agents, such as, for example, fillers, agents which promote scratch-resistance, brighteners, dyes and/or pigments. When a preparation contains a filler, an anti-slip layer which is opaque is obtained when the preparation is used. Coloured anti-slip layers can be produced by the use of dyes and/or pigments.

The coating composition according to the invention preferably contains a polyester resin, a polyacrylate resin, a halogen-containing polymer resin, an epoxy resin, a polyamide resin, a polyurethane resin or an alkyd resin.

When the coating composition contains a polyester resin, the polyester resin is preferably a saturated polyester having terminal hydroxyl groups, the hydroxyl group content being between 4.0 and 7.0% by weight.

When the coating composition contains a polyacrylate resin, the polyacrylate resin is preferably a polyacrylate having terminal hydroxyl groups, the hydroxyl group content preferably being between 3 and 5% by weight.

Fluorine-containing polymers are an example of a suitable halogen-containing polymer resin.

When the coating composition contains an epoxy resin, the epoxy resin is preferably derived from bis-phenol A and epichlorohydrin and the epoxy resin has a molecular weight of less than 700.

When the coating composition contains a polyurethane resin, the polyurethane resin is preferably an aliphatic polyurethane resin which has been cured using hexamethylene diisocyanate. The resin can also be a polyester-polyurethane resin, such as, for example, Uracron CY499E, which is marketed by DSM Resins B.V.

In addition to a coating composition containing particulate material, the preparation according to the invention contains a curing agent. Said curing agent ensures that when the preparation is applied to a surface the coating composition is cross-linked to produce an anti-slip layer. When the coating composition contains a saturated polyester having terminal hydroxyl groups, a polyacrylate having terminal hydroxyl groups or a fluorine-containing polymer, the curing agent is preferably a diisocyanate and in particular hexamethylene diisocyanate. When the coating composition contains an epoxy resin, the curing agent is preferably a diisocyanate and in particular 2,4-diisocyanotoluene or a polyamide having terminal amino groups, such as, for example, those derived from a dibasic carboxylic acid and an excess of a polyamine, such as N-(2-aminoethyl)-1,2-ethanediamine.

The preparation according to the invention is preferably used in the form of a two-component system, the coating composition and the curing agent being mixed in a volume ratio of between 1:1 and 1:10 for 15–60 minutes by stirring before use. Preferably, the ratio of the coating composition to the curing agent is between 1:2 and 1:6 and the ratio is in particular approximately 1:2. The pot life at 20° C. is at least 4 hours and in particular at least 8 hours.

The preparation according to the invention furthermore contains preferably 5–50% by weight synthetic granules and in particular 10–30% by weight.

The preparation according to the invention has particularly good properties in respect of substrate wetting, anti-pitting, Benard cells, scratch resistance and ventilation.

The preparation according to the invention can contain one or more organic solvents or water as diluent. Preferably, the preparation according to the invention is a preparation which has a high solids content, such as, for example, so-called "high solids coatings" or a preparation which contains water as the only diluent. The preparation according to the invention is preferably diluted to approximately 40–50% by volume (this corresponds approximately to 10–25% by weight).

The preparation according to the invention can be applied by means of brushing, spraying, spatula application or painting. Preferably, the preparation is applied by means of spraying using so-called "high volume low pressure" equipment or a brush of a special design.

The preparation according to the invention can optionally contain an agent which promotes cross-linking, such as dibenzyl peroxide or dibutyl-tin dilaurate. What is important in this context is that the agent which promotes cross-linking is able to act at ambient temperature, although agents which promote cross-linking which are effective at high temperature, for example a temperature of up to 100° C., can also be used.

The preparation according to the invention is suitable for applying an anti-slip layer to surfaces of various materials, for example tiles, concrete, wood, stone, synthetic materials, iron, steel, enamelled materials, cushioned vinyl and the like. The surface to be coated can be flat, convex or concave, such as, for example, the surface of tiled floors, shower trays and bathtubs.

The invention also relates to a method for applying an anti-slip layer to a surface, wherein, in a first step, the surface is pre-treated with a cleaning agent and then with an adhesion promoter and, in a second step, the preparation according to the invention is applied to the surface. The pre-treatment with the cleaning agent and with the adhesion promoter is carried out in order to obtain good adhesion of the preparation to the surface.

If the surface is a silicon-containing surface, such as, for example, stone or concrete, the surface is cleaned first with a cleaning agent and then with a polysiloxane, where, according to the invention, the polysiloxane is preferably a mixture of 3-aminopropyltriethoxysilane and bis(3-triethoxysilylpropyl)amine of technical grade. A highly suitable product is, for example, Boran Adhesive Promoter.

If the surface is a synthetic material containing surface, the surface is preferably treated first with a cleaning agent and then with an adhesion promoter consisting of a polar polymer liquid. An example of a suitable adhesion promoter is Boran Adhesive HK 363, which is marketed by Baderet Int. B.V. Another suitable adhesion promoter is HK 463.

According to the invention, the cleaning agent used is preferably an organic liquid which contains one or more polar organic compounds. A suitable cleaning agent is Boran Degreaser, which is marketed by Baderet Int. B.V.

The invention also relates to a method for applying an anti-slip layer to a surface, wherein synthetic granules and in particular polypropene or EPDM granules are used.

The invention also relates to a product which is provided with an anti-slip layer which comprises a preparation comprising a particulate material, the particulate material consisting of synthetic granules and in particular of polypropene or EPDM granules. Products which can be provided with an anti-slip layer are, for example, bathtubs, shower trays and tiled floors, such as tiled floors in hospitals, hotels and swimming pools.

The invention will be further explained with the aid of examples.

EXAMPLE 1

The surface of a tiled floor was first cleaned thoroughly with soap and water. The surface was then dried thoroughly. In a subsequent step, the surface was degreased by removing the grease with a cloth which had been saturated with an organic liquid (Boran Degreaser). The final step in the pre-treatment comprised the application of an adhesion promoter (3-aminopropyltriethoxysilane/bis(3-triethoxysilylpropyl)amine of technical grade).

A preparation according to the invention was then prepared by mixing a polyurethane coating (Boran Gloss or Boran Semi-Gloss, which is marketed by Baderet Int. B.V.) and a curing agent containing hexamethylene diisocyanate (Boran Harder, which is marketed by Baderet Int. B.V.) in a volume ratio of 1:2 by stirring. Then 0.3% by weight of the cross-linking accelerator and subsequently 12% by weight polypropene granules were added to the resulting mixture, the polypropene granules having an average particle size of 5 to 90 $\mu$m, a melt flow index (ASTM D238; 5 kg/230° C.) of 180 g/10 min, a Shore D hardness (ASTM D2240) of 70, a density of 0.905 g/cm$^3$ and a melting range (DSC; 10° C./min) of 162–168° C. The mixture thus obtained (Boran Structuur, Gloss or Semi-Gloss) was then stirred for about 45 minutes, after which the preparation obtained was applied to the tiled floor with the aid of a "high volume low pressure" paint sprayer.

The anti-slip layer applied to the tiled floor was dry after about four hours, so that it was possible to walk on the tiled floor again four hours after application of the anti-slip layer. The coverage for a layer thickness of about 50 $\mu$m was about 10 m$^2$/kg.

EXAMPLE 2

The test in Example 1 was repeated, except that a shower tray was provided with an anti-slip layer, for which purpose a template with a four-leaf clover pattern was used. The anti-slip layer thus obtained consisted of non-linked areas in the shape of a four-leaf clover.

EXAMPLE 3

In this example procedures for the preparation of preparations having a fine and a coarse structure, respectively, are described.

TABLE A

| Fine structure | |
|---|---|
| Mixing ratio Boran Semi-Gloss[a]: Boran Harder[b]: | 100.38–100.50 (w/w)[c] |
| Pot life (20° C.) | min. 8 hours |
| Av. particle size of polypropene granules | 5–90 $\mu$m |
| Cross-linking accelerator | 0.04% by weight |
| Dilution[d] (application by brush) | 20% by weight |
| Dilution[d] (application by spraying) | 20–30% by weight |

[a]Polyurethane coating (high gloss > 80% according to Glans 60; flash point < 21 ° C.; density = 1.1–1.3 g/cm$^3$; 44% by weight solids).
[b]Hexamethylene diisocyanate
[c]Depending on colour
[d]Boran Thinner

TABLE B

| Coarse structure | |
|---|---|
| Mixing ratio Boran Gloss[a]: Boran Harder: | 100:48 (w/w) |
| Pot life (20° C.) | min. 6 hours |
| Av. particle size of polypropene granules | 20–200 $\mu$m |
| Cross-linking accelerator | 0.04% by weight |
| Dilution[b] (application by brush) | 15% by weight |
| Dilution[b] (application by spraying) | 15–20% by weight |

[a]Polyurethane coating (semi-matt 20–40% according to Glans 60; flash point < 21° C.; density = 1.1–1.3 g/cm$^3$; 44% by weight solids).
[b]Boran Thinner.

The diluent Boran Thinner contains organic solvents (xylenes, n-butyl acetate and 2-butanone) and a tracer.

EXAMPLE 4

In this example mixing ratios for the preparation according to the invention as a function of the colour of the preparation are described (Table C).

TABLE C

| Clear | |
|---|---|
| coating[a] ; curing agent[b] | 100:50 (w/w) |
| synthetic granules | 12% by weight |
| diluent[c] | 15% by weight |
| Pale colours | |
| coating[a]: curing agent[b] | 100:38 (w/w) |
| synthetic granules | 10% by weight |
| diluent[c] | 20% by weight |
| Dark colours | |
| coating[a]: curing agent[b] | 100:48 (w/w) |
| synthetic granules | 10% by weight |
| diluent[c] | 15% by weight |

[1]Polyurethane coating
[b]Hexamethylene diisocyanate
[c]Boran Thinner

EXAMPLE 5

The polyurethane coating Boran Semi-Gloss can have the following composition:

| | |
|---|---|
| - polyurethane resin | 47.8% by weight |
| - agents promoting scratch resistance | 2.4% by weight |
| - brightener | 8.8% by weight |
| - cross-linking accelerator | 0.1% by weight |
| - diluents | 28.9% by weight |
| - polypropene granules | 12.0% by weight |
| | 100.00% by weight |

EXAMPLE 6

This example gives a composition for a water-based preparation.

TABLE D

| | |
|---|---|
| Coating [a] | 61.90% by weight |
| Curing agent[b] | 13.55% by weight |
| Water (demineralized) | 23.50% by weight |
| Surface-active agent | 0.35% by weight |
| Binder[c] | 0.70% by weight |

[a]Aliphatic polyester-polyurethane
[b]Hexamethylene diisocyanate (NCO content: 23% by weight)
[c]40% solution in a mixture of water, dimethylethanolamine and ethoxypropyl acetate or methoxypropyl acetate; pH = 7.0–8.5; hydroxyl number (based on the solid material) = 3.1–3.6.

6% weight polypropene granules (according to Example 1) or granules of EPDM rubber are added to this mixture.

EXAMPLE 7

This example gives a composition for a water-based clear preparation.

TABLE E

| | |
|---|---|
| Coating[a] | 21.1% by weight |
| Curing agent[b] | 36.9% by weight |
| Water (demineralised) | 40.7% by weight |
| Surface-active agent | 0.55% by weight |
| Matting agent | 0.75 |

[a]Epoxy resin (viscosity = approx. 3250 mPa.s; epoxy value = 0.525; average epoxy equivalence = 190; solids content = 100%)
[b]Amine (viscosity = approx. 40,000 mPa.s; amine number = 125; active equivalence = 335; solids content = 50%)

Approximately 6% by weight polypropene granules (according to Example 1) or granules of EPDM rubber are added to this mixture.

What is claimed is:

1. Preparation for applying an anti-slip layer to a surface, wherein the preparation comprises a coating composition containing a resin and a particulate synthetic material, wherein the coating composition further contains a curing agent and said particulate synthetic material is an apolar synthetic material and has a Shore D hardness of 50 to 85, and wherein the preparation contains polysiloxane as a surface-active agent.

2. Preparation according to claim 1, wherein said synthetic material comprises granules produced from one of polypropene, polyethene, polystyrene, copolymers of ethene and vinyl acetate, copolymer of ethene and unsaturate alkenes, and an EPDM rubber.

3. Preparation according to claim 1, wherein said synthetic material comprises granules produced from one of polypropene and an EPDM rubber.

4. Preparation according to claim 1, wherein said synthetic material comprises granules which have an average size of 20 to 400 µm.

5. Preparation according to claim 4, wherein said granules have an average size of 30 to 100 µm.

6. Preparation according to claim 4, wherein said granules have an average size of 100 to 300 µm.

7. Preparation according to claim 1, wherein the preparation also contains one or more fillers, agents promoting scratch resistance, brighteners, dyes, and pigments.

8. Preparation according to claim 1, wherein said resin is one of a polyester resin, a polyacrylate resin, a halogen-containing polymer resin, an epoxy resin, a polyamide resin, a polyurethane resin, and an alkyd resin.

9. Method for applying an anti-slip layer to a surface, wherein:
 (i) the surface is pre-treated with a cleaning agent and then with an adhesion promoter and
 (ii) the preparation according to claim 1 is applied to the surface.

10. Method according to claim 9, wherein the surface is a silicon-containing surface and the adhesion promoter is a polysiloxane.

11. Method according to claim 10, wherein the polysiloxane contains one of 3-aminopropyltriethoxysilane and bis(3-triethoxysilylpropyl)amine.

12. Method according to claim 9, wherein the surface is a synthetic material and the adhesion promoter consists of a polar polymer liquid.

13. Method according to claim 12, wherein the adhesion promoter contains one or more synthetic resins.

14. Product which has been provided with an anti-slip layer which comprises a preparation according to claim 1.

* * * * *